United States Patent [19]

Hartemann et al.

[11] 4,212,206
[45] Jul. 15, 1980

[54] ULTRASONIC SYSTEM FOR THE VISUAL DISPLAY OF A THIN SECTION OF A BODY

[75] Inventors: Pierre Hartemann; Roger Torguet, both of Paris, France

[73] Assignee: Thomson-CSF, Paris, France

[21] Appl. No.: 950,144

[22] Filed: Oct. 10, 1978

[30] Foreign Application Priority Data

Oct. 7, 1977 [FR] France .............................. 77 30245

[51] Int. Cl.² .......................................... G01N 29/00
[52] U.S. Cl. ...................................... 73/606; 73/526; 367/7; 128/660
[58] Field of Search ............... 73/606, 607, 625, 626, 73/628; 340/3 R, 5 MP; 128/660; 367/7, 11

[56] References Cited

U.S. PATENT DOCUMENTS

| | | | |
|---|---|---|---|
| 3,899,767 | 8/1975 | Jones ................................ | 340/5 MP |
| 3,953,825 | 4/1976 | Kino et al. ........................ | 73/626 |
| 4,006,627 | 2/1977 | Bossaert .......................... | 73/608 |
| 4,099,419 | 7/1978 | Kuroda et al. ................... | 73/626 |

*Primary Examiner*—Stephen A. Kreitman
*Attorney, Agent, or Firm*—Cushman, Darby & Cushman

[57] ABSTRACT

The invention relates to ultrasonic systems for the visual display of a thin section of a body. The subject of the invention is a system wherein the multi-element scanning probe which picks up or transmits the ultrasonic energy cooperates with an array of elastic-surface-wave transducers and with a group of frequency converter circuits in order to constitute an ultrasonic lens. The invention is more particularly applicable to the non-destructive examination of bodies permeable to ultrasonic energy such as is practiced for example in medicine and when industrial goods are being checked.

17 Claims, 11 Drawing Figures

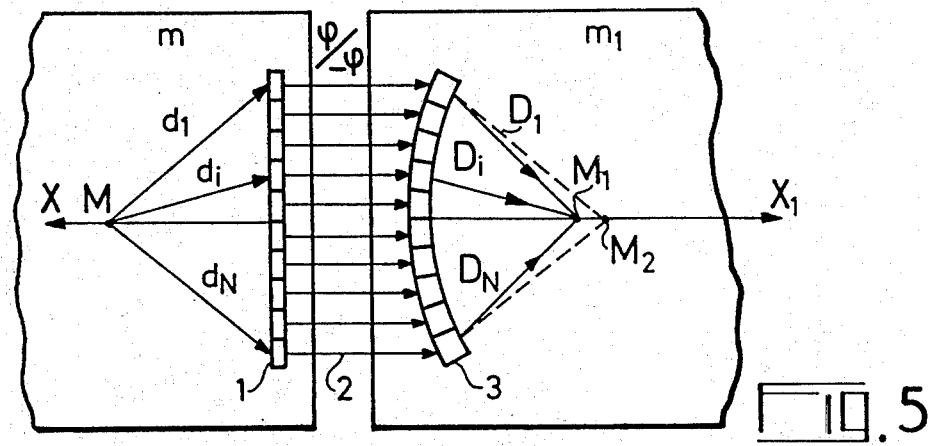
Fig. 5
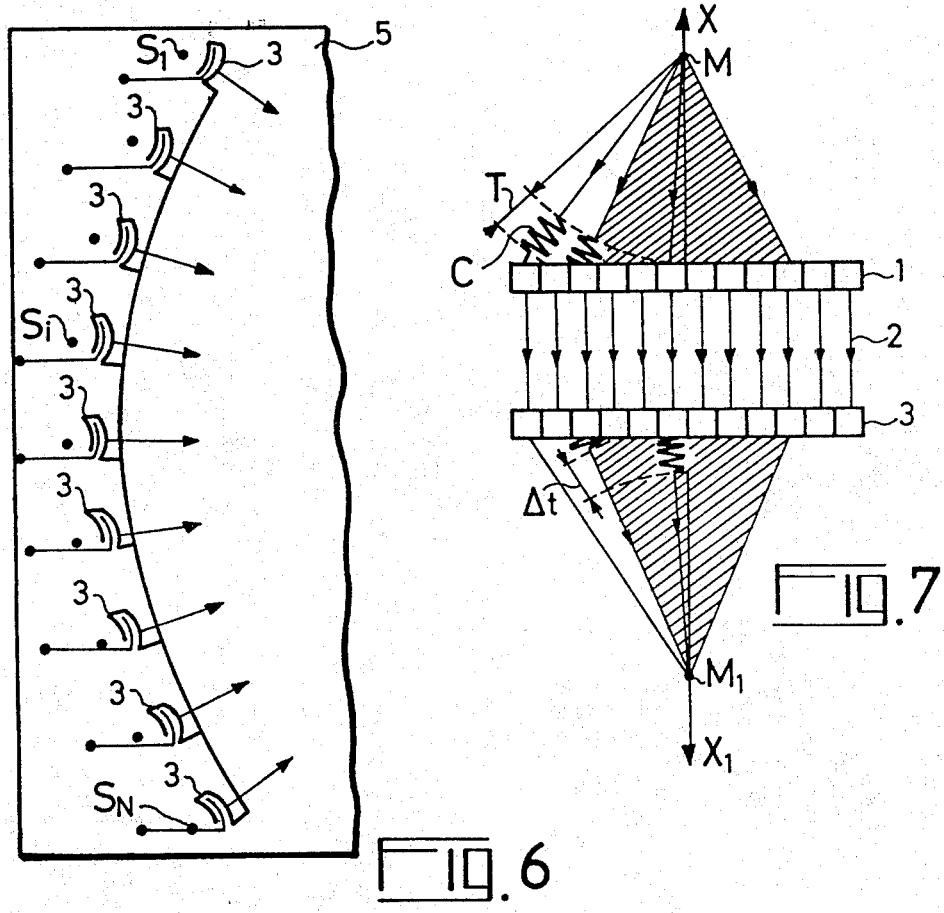
Fig. 6
Fig. 7

ULTRASONIC SYSTEM FOR THE VISUAL DISPLAY OF A THIN SECTION OF A BODY

The present invention relates to ultrasonic visual display systems which enable the image of a thin section of a body to be formed. This technique is based on the directivity of beams of ultrasonic waves, on reflections which occur each time the acoustic impedance of the propagation medium changes and on the evaluation of transmission delays, which enables the reflecting zones to be accurately located.

In ultrasonic visual display systems, a visible-image may be formed by using a coherent light-beam passing through an ultrasonic tank wherein the body to be examined is immersed. Bragg diffraction of the light radiated by the ultrasonic wavefronts emerging from the insonified body produces an optical image. This technique has been improved by using a multi-element scanning probe which avoids the need for immersing the body to be examined in a tank. Nevertheless, the principle of reconstructing a visible image by diffraction is difficult to use, since it is necessary to provide a source of coherent light associated with an optoacoustic cell connected to the probe and optical means for analysing the reconstructed image which enable a slice of the insonified body to be displayed on a television screen.

With a view to overcoming the drawbacks inherent in this technique, the invention proposes that the scanning probe be associated with an array of surface-wave transducers arranged on a substrate so as to constitute a lens capable of forming the ultrasonic image of the cut being sensed by the probe. The ultrasonic image thus produced is analysed by a set of surface-wave transducers connected to the television monitor which displays the image of the cut. Thus, the optical means for reconstructing the image by Bragg diffraction and the means for analysing the reconstructed image are replaced by an elastic-surface-wave device which is much less expensive and bulky. The reversible operation of this device furthermore enables the scanning probe to be used either as an ultrasonic receiver or as a transmitter enabling scanning to be carried out by an angular sweep with a choice of a plurality of focussing lines.

In accordance with the present invention, there is provided a system for visually displaying the image of a thin section of a body of ultrasonics, said system comprising: an ultrasonic generator, a scanning probe and means for visual display of said image; said system further comprising: a frequency-converter ultrasonic lens made up of a first array of N bulk wave electromechanical transducers forming said scanning probe, a group of N frequency conversion circuits connected to a common local oscillator and a second array of N surface-wave electromechanical transducers arranged on a substrate; said first and second arrays of transducers having their corresponding transducers interconnected two-by-two by said frequency conversion electrical circuits so as to constitute a transmission link having N channels in which N electrical signals circulate; the frequency of said bulk waves being equal to the difference between the frequency of said surface waves and that of the signal produced by said local oscillator; the surface of the substrate carrying said second array of N transducers being equipped with at least one third array of surface-wave electromechanical transducers which, imaged by said frequency converter ultrasonic lens, carries out discrete scanning of the section through focussing the ultrasonic energy exchanged between said ultrasonic generator and said visual display means.

For a better understanding of the present invention, and to show how the same may be carried into effect, reference will be made to the following description and the appended drawings, wherein:

FIG. 5 illustrates a variant of embodiment of the ultrasonic lens according to the invention;

FIG. 6 illustrates a configuration of surface-wave transducers;

FIG. 7 is an explanatory Figure;

Figure 1:
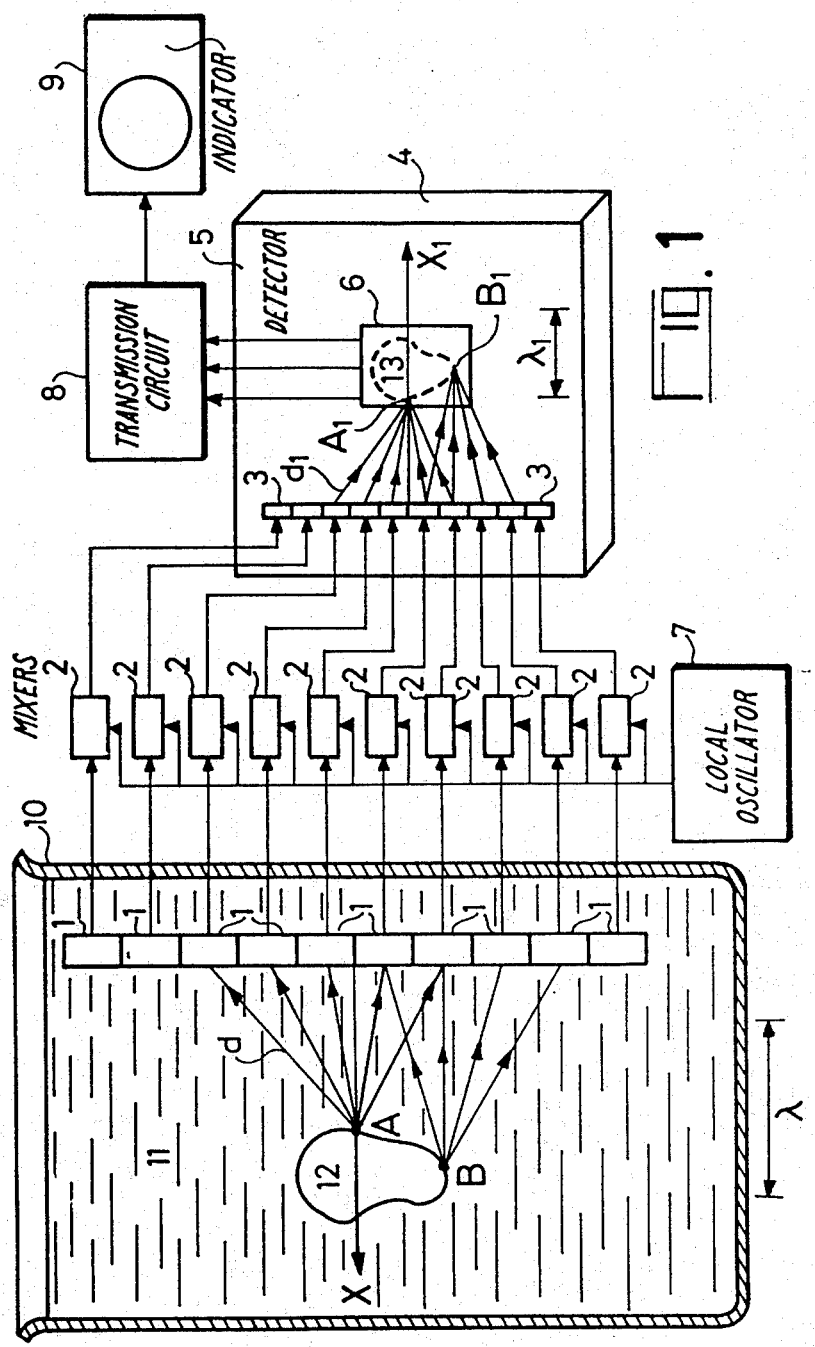
FIG. 1 illustrates an ultrasonic visual display system according to the invention.

The chief elements of an ultrasonic visual display may be seen in FIG. 1. This system comprises a multi-element scanning probe made up of a row of bulk wave electromechanical transducers 1. In order to illustrate an easily understood case of operation, the probe 1 is shown in a tank 10 containing a liquid 11 in which is immersed the body 12 whereof it is desired to present a cut visually. In a medical application, the body 12 would be an organ to be examined, and the medium 11 would consist of the tissues surrounding the organ 12; the probe 1 would simply be brought to bear against the epidermis of the patient in order to pick up via the permeable tissues the ultrasonic radiation emanating from the organ 12.

In order to simplify FIG. 1, the ultrasonic transmitter used for insonification of the body is not illustrated. In an echographic version sounding may be carried out by causing the probe 1 to transmit an ultrasonic pulse at a frequency $F_1$. By virtue of the directivity of the transducers 1, the ultrasonic radiation transmitted is confined to a laminar beam orientated parallel to the plane of FIG. 1. Displacing the probe 1 perpendicularly to the plane of FIG. 1 enables a plurality of sections of the body 12 to be successively visually presented. It may hereinafter be assumed that the points A, B of the body 12 are continuously transmitting ultrasonic energy on a wavelength $\lambda$. The ultrasonic energy takes the form of rays d which reach the transducers 1 of the probe. FIG. 1 illustrates a rectilinear array of N transducers 1, and the axis X is the normal passing through the middle of the row of transducers.

In order to obtain the lens effect set out above, the N transducers 1 are connected by a group of N frequency-conversion circuits 2. A local oscillator 7 working at the frequency F is connected to each frequency conversion circuit 2. A local oscillator 7 working at the frequency F is connected to each frequency conversion circuit 2. The circuits 2 deliver ultrasonic electrical signals at a frequency $F_2$ corresponding to the difference between frequencies F and $F_1$; these frequency-converted signals are applied to an array of N surface-wave electromechanical transducers which are arranged on the surface S of a substrate 4.

Since the frequencies F and $F_2$ are advantageously higher than the frequency $F_1$ of the waves picked up by the scanning probe 1, and regard being had to the respective velocities of propagation in the medium 11 and on the surface 5, it will be seen that the wavelength $\lambda_1$ of the surfaces waves is less than $\lambda$.

To start it may be assumed that the row 3 exhibits a pattern similar to that of the row 1, with a scaling down ratio of $k=\frac{1}{2}$. This hypothesis is not limitative, as will be seen later. It being known that only the lower beat frequency is transmitted, that is to say that the frequency of the local oscillator 7 is equal to the sum of the frequencies $F_1$ and $F_2$, it will be appreciated that a phase-shift $\phi$ existing between the signals delivered by two transducers 1 is changed in sign when consideration is given to the two frequency-converted signals which are applied to the two counterpart transducers 3. When the point A of the object is considered as an ultrasonic point-source, the rays which impinge on the transducers 1 are of unequal lengths. This results in phase-shifts $\phi$ between the signal delivered by the transducers 1. They depend strictly on the position of the point A, the wavelength $\lambda$ and the configuration of the scanning probe 1. Other phase-shifts would be obtained for a point B. After frequency-conversion, the same phase-shifts exist, but changed in sign. There is therefore a point $A_1$ on the surface 5 where the surface waves will form a point ultrasonic image of the point A. The same applies to the point B, which is imaged at $B_1$. Finally, an ultrasonic image 13 of the section of the object 12 is formed in the surface 5. Since it has been assumed that the array 3 is reduced in the ratio of k, the image 13 is likewise reduced k times with respect to the section of the object 12. In conclusion, the group comprising the array 1, the circuits 2 and 7 and the array 3 works after the manner of a lens. According to the invention, the ultrasonic image 13 is picked up by a group 6 of receiving transducers whereof the detailed configuration will be given hereinafter. The electrical signals delivered by the detector group 6 are applied to a visual-display device 9 of the television receiver type. Regards being had to the method of visual presentation on the screen of the device 9, a transmitting circuit 8 directs the detected signals and distributes them in time. The normal $X_1$ passing through the middle of the array 3 is the image of the axis X.

The diagrams of FIGS. 1, 2, 3 and 4 make it easier to grasp the resemblances and differences which exist between the ultrasonic lens which has just been described and a conventional optical lens.

Figure 2:
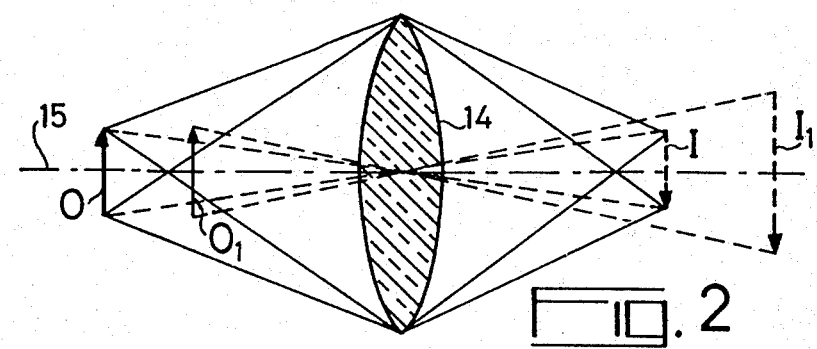
FIGS. 2, 3 and 4 are explanatory diagrams.

An optical lens 14 cut out of a transparent refractive medium may be seen in FIG. 2. This convergent lens having an optical axis 15 forms the image of the object O at I, and the image of the object $O_1$ at $I_1$. It will be appreciated that the nearer the object is to the lens the further away therefrom does the image move.

Figure 3:
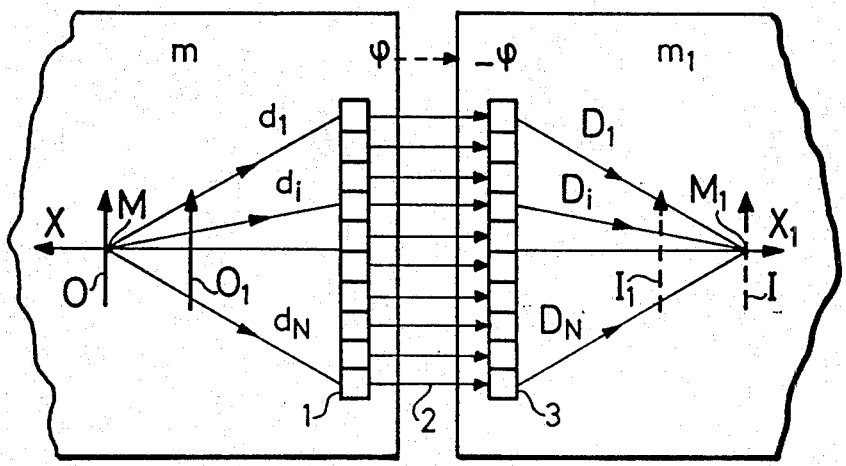

A frequency converter ultrasonic lens may be seen in FIG. 3. The bulk waves picked up by the multielement probe 1 are propagated in the propagation medium m. A group of frequency-conversion transmission channels 2 changes the sign of the phase of the signals applied to the array of transducers 3. The array of transducers 3 radiates elastic-surface waves into the medium $m_1$. The object O is imaged at I, since rays $d_1$ to $d_N$ start from the point M and are focussed in the form of rays $D_1$ to $D_N$ intersecting at the point $M_1$. In other words, isochronous radiation transmitted from the point M recurs in isochronic from at $M_1$ by virtue of the change of sign of the phase $\phi$. It will be appreciated that an object $O_1$ disposed nearer to the probe 1 is imaged at $I_1$ likewise nearer to the array 3. This shows that the concept of magnification is not the same as in optics. The example of FIG. 3 is that of operation with unity magnification. In this case the wavelengths are the same as in the media m and $m_1$.

The ultrasonic lens of FIG. 3 is capable of working in both directions. In particular, the surface wave transducers 3 can receive a surface wave from the point $M_1$, and the probe 1 then transmits a beam of waves which converge at M. The frequency-converter circuits must naturally work in the opposite direction.

As compared to the optical lens, the ultrasonic lens exhibits a difference which depends on the directivity of the elementary transducers constituting the arrays 1 to 3.

Figure 4:
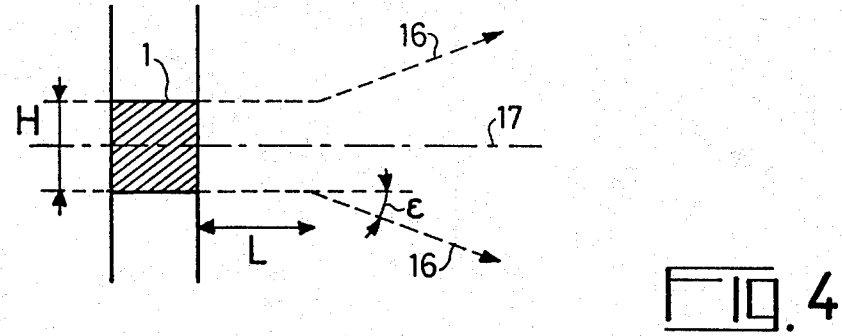

It will be seen in FIG. 4 that a transducer 1 having an axis 17 and a height H can only pick up ultrasonic waves inside the outline 16. The cylindrical portion of this outline has a length L equal to $H^2/4$, and the conical portion exhibits an aperture angle equal to $\lambda/H$. These values correspond to the first zero of the diffraction pattern.

Because of this fact, all the transducers 1 do not necessarily co-operate in forming the image of a given point of the object.

Independently of this notion of directivity, the fact that certain transducers in the array do not participate in forming the image of a point may result from the time during which the ultrasonic energy is applied.

An ultrasonic lens similar to that of FIG. 3 may be seen in FIG. 7. The ultrasonic energy emanating from the point M occurs in the form of a pulse C having a duration T. The energy re-radiated by the array 3 is made up of pulses offset by $\Delta t$. In the shaded area, this time delay $\Delta t$ does not exceed the duration T, so that the transducers 1 and 3 which cover the shaded area co-operate when the ultrasonic energy emanating from the point M is being focussed. The other available transducers contribute when the energy emanating from points situated outside the axis X is being focussed.

When the configuration of the arrays 1 and 3 are the same except for the sealing ratio, focussing with magnification equal to the ratio of wavelengths is obtained.

Nevertheless, the configurations of the arrays 1 and 3 may differ from one another, as FIG. 5 shows. The scanning probe 1 is made up for example of a rectilinear array of transducers, but the array 3 is concave instead of being rectilinear. If the array 3 were rectilinear the image of the point M would be formed at $M_2$. However, the concavity of the array 3 displaces the image, which in fact forms at the point M. It will be appreciated that the concavity of the arrays causes a larger number of transducers to participate in focussing in cases in which the directivity of the transducers or the duration of the pulses can limit this number.

An advantageous form of embodiment of the array of surface-wave transducers may be seen in FIG. 6. There is a piezoelectric substate, on the surface 5 of which electrodes in the form of interdigitated combs have been deposited. In order to reduce the directivity of the transducers 3, the teeth of the combs are concave, so that the latter behave as a concave array of point sources $S_1$ to $S_N$.

Similar arrangements may be adopted on the side of the scanning probe 1, for example by hollowing out the transmitting faces of the bulk-wave transducers in order to make them less directive.

By way of non-limitative example, an ultrasonic lens such as that described can receive bulk wave at a frequency of 3 MHz. With a local oscillator working at 18.5 MHz, the surface waves transmitted by the array of transducers 3 have a carrier frequency of 15.5 MHz. The scanning probe 1 comprises for example 40 juxtaposed transducers each having a height H equal to 2.5 mm. The array of transducers 3 may be deposited on a strip of piezoelectric ceramic, which leads to a wavelength $\lambda_1$ of 140 $\mu$m. If the scanning probe 1 is coupled to tissues where the phase velocity is of the order of 1500 meters/sec, the wavelength $\lambda_y$ is equal to 500 $\mu$m, whence a scaling down ratio of ⅓. If the region to be scanned measures 10 cm × 15 cm, the zone of the board 4 reserved for the formation of the ultrasonic image of the section being analysed may measure 3 cm × 5 cm.

Figure 8:
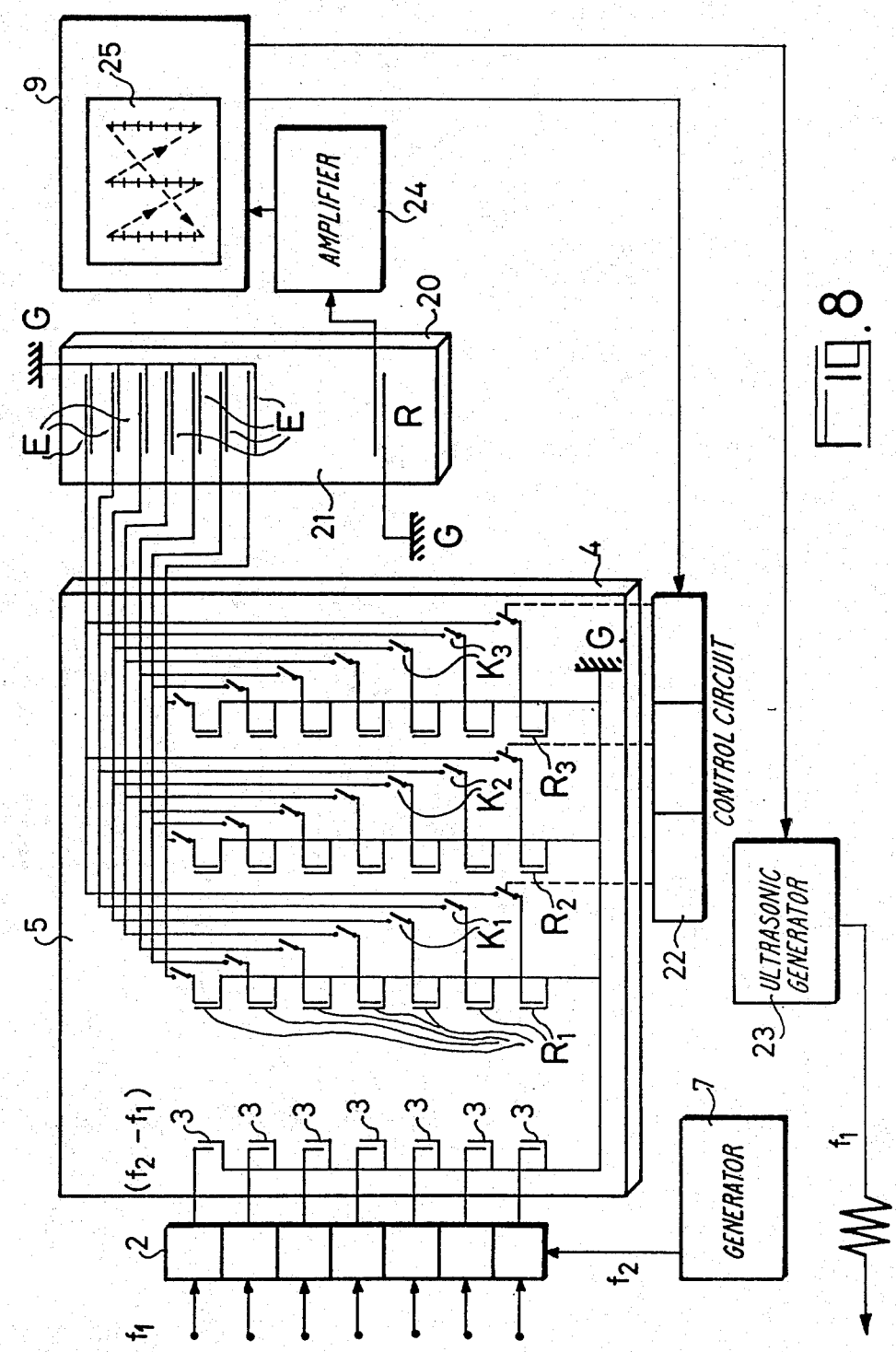
FIG. 8 illustrates the system of FIG. 1 in more detailed fashion.

FIG. 8 illustrates in more detailed fashion the elements 6, 8, and 9 which analyse the ultrasonic image 13.

A group of N frequency-converter circuits 2 receives the ultrasonic signals at frequency $f_1$ which are supplied from the N transducers 1 of the scanning probe. The frequency-converter circuits 2 receive the local oscillation signal at a frequency $f_2$ provided by the local oscillator 7. The lower beat frequency $f_2-f_1$ feeds the array of transducers 3 which transmit the surface waves 5 on the substrate 4. A plurality of rows $R_1$, $R_2$, $R_3$ of surface-wave transducers are arranged in the zone where the ultrasonic image is formed. These transducers advantageously take the form of interdigitated combs having a common ground connection G. Stacks of switches $K_1$, $K_2$, $K_3$ enable the combs in one of the rows $R_1$, $R_2$, $R_3$ to be connected to a group of transducers E. The transducers E likewise take the form of interdigitated combs deposited on the surface 21 of a substrate 20, for example of lithium niobate. A receiving comb R, likewise deposited on the surface 21, receives the surfaces waves transmitted by the set of transducers E with staggered delays. A detector-amplifier 24 receives the delayed signals and applies them to the modulating input of the visual-display device 9. The visual display device 9 takes the form for example of a cathode-ray tube whereof the screen 25 is swept vertically at a first rate, and horizontally at a second and slower rate. Upon each vertical sweep flyback, a pulse received by a control circuit 2 closes another stack of switches $K_1$, $K_2$ or $K_3$, which connects up a row $R_1$, $R_2$ or $R_3$ of transducers. Upon each horizontal sweep flyback, the visual-display device supply a pulse to the ultrasonic generator 23. An ultrasonic pulse is thus transmitted to the body to be analysed, and insonifies it. The ultrasonic energy picked up on the return path by the scanning probe forms a slice of the ultrasonic image of the section to be visually displayed. This imaged slice moves away from the array 3, successively reascending the analysing rows $R_1$, $R_2$ and $R_3$. The signals delivered by the rows $R_1$, $R_2$ and $R_3$ are distributed in time by the staggered delay line 20, and they take it in turns to modulate the luminance of the spot formed on the screen of the cathode-ray tube. Since the sweep of the screen 25 is synchronised with the progression of the surface waves on the substrates 4 and 20, a visible image corresponding to the ultrasonic cut is obtained in a time shorter than the recurrence period of the ultrasonic transmissions.

The visual-presentation device of FIGS. 1 and 8 visually presents a uniformly insonified section.

Figure 9:
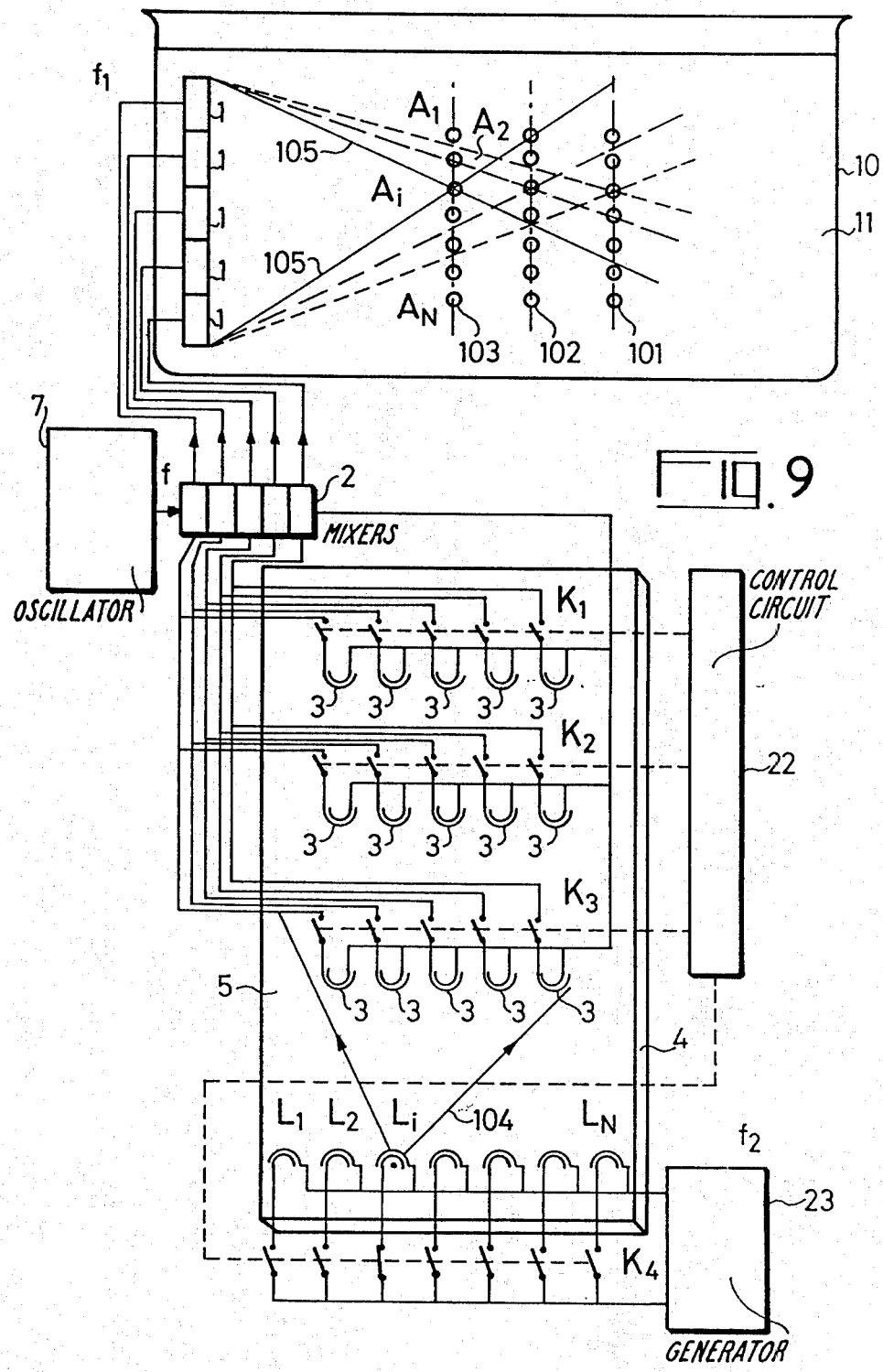
FIG. 9 illustrates an ultrasonic visual display system in which the scanning probe works as an ultrasonic transmitter.

FIG. 9 shows the transmitting portion of a visual-display device wherein a section is analysed by localised insonification by means of an ultrasonic beam capable of being angularly swept and of being focussed at various distances from the transmitting probe.

The device comprises a scanning probe comprising an array of M ultrasonic transducers 1 transmitting bulk waves at a frequency of $f_1$ into a propagation medium 11 contained in a tank 10. In this case, the body to be examined is immersed in the tank at the place where the scanning probe 1 causes the ultrasonic radiation to converge. Electrical excitation of the transducers 1 is provided by a set M of frequency-conversion circuits 2 which receive from the oscillator 7 a local oscillation signal at a frequency f. The input terminals of the circuits 2 are excited by ultrasonic electrical signals at a frequency $F_2$. These signals are generated by rows of elastic-surface-wave transducers 3 which are arranged on the surface 5 of a substrate 4. A row of N elastic-surface-wave transducers $L_1$, $L_2$, ... $L_i$, ... $L_N$ provides point source radiation of surface waves directed at a plurality incidences to the array of transducers 3. The transducers $L_1$, $L_2$, $L_i$, $L_N$ are excited one after the other by means of a generator 23 delivering ultrasonic energy at a frequency $f_2$. A set of change-over switches $K_4$ switches over the sources $L_1$ to $L_N$ under control of a circuit 22 which arranges the scanning of the body whereof it is desired to display the section visually.

The circuit 22 also controls a plurality of stacks of change over switches $K_1$, $K_2$, $K_3$ which successively connect the rows of transducers 3 to the inputs of the frequency-converter circuits 2.

The group comprising the scanning probe 1, the circuits 2 and 7 and one of the rows of transducers 3 has properties of a lens of predetermined focal length. For example, when the change-over switches $K_3$ are closed the image of the sources $L_1$ to $L_N$ forms on the line 103 in the form of elementary images $A_1$ to $A_N$. One of the switches $K_4$ must be closed in order to form the image $A_i$ on the line 103. This results in transmission of the beam 104, and consequently of the beam 105.

Another switch $K_4$ is actuated in order to project the beam 105 at another point of the line 103, thus causing the line 103 to be angularly swept by discrete values.

Opening the change-over switches $K_3$ and closing the change over switches $K_2$ or $K_1$ enables scanning of the line 103 to be transferred to the lines 102 or 101. This produces a sweep by moving away on three lines of focussing.

The means illustrated in FIG. 9 enable the section of a body to be scanned point by point by means of a convergent ultrasonic beam. In order to display the section visually, it is necessary to pick up the ultrasonic energy re-transmitted by the body at each point which has been insonified. The pick-up may take the form for example of a non-directional transducer element capable of converting the bulk waves into a signal modulating the writing-in beam of the visual display device. In this case, the change-over switches $K_1$, $K_2$, $K_3$ and $K_4$ must be controlled in synchronism with the sweep of the visual-display screen.

Consideration has been given in the foregoing to the case of an ultrasonic lens enabling a true image situated at a finite distance to be obtained.

It is however possible to imagine the projection of a virtual image, which would lead to the sign of the phase-shift in the signals not being changed upon frequency-conversion.

Figure 10:
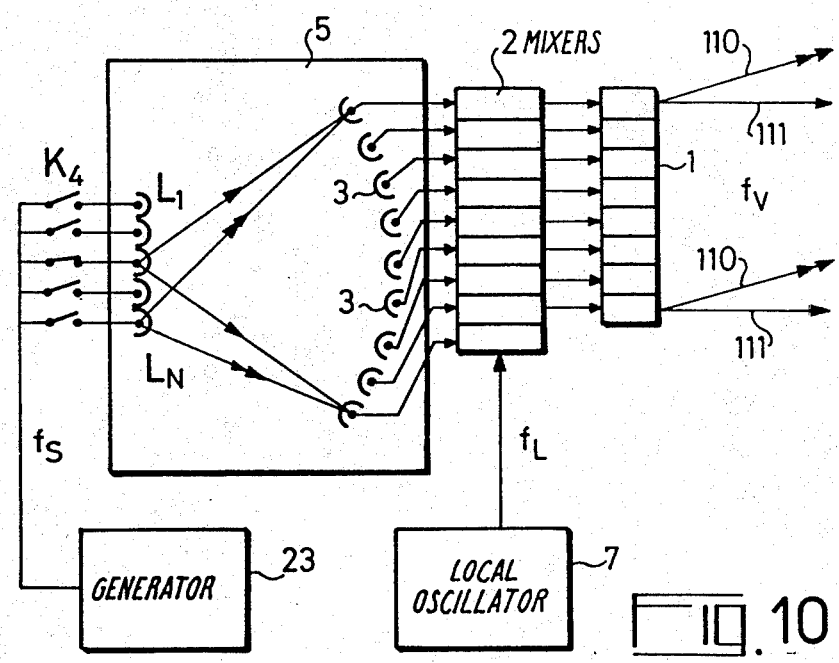
FIG. 10 illustrates a variant embodiment of the arrangement of FIG. 9.

In order to illustrate this form of operation, FIG. 10 shows a scanning probe 1 associated with surface-wave elements which are so arranged on the face 5 that a substantially parallel beam 111 is obtained. Changing over the sources $L_1$ to $L_N$ by way of the switches $K_4$ can cause the radiation to change direction while remaining parallel. In FIG. 10, the beam 111 is obtained when the transmitting source is that situated in the middle of the row $L_1$, $L_N$; the beam 110 is obtained when the end source $L_N$ is transmitting the ultrasounds. The array of transducers 3 is concave on an arc having a circumference whose centre is situated at the middle of the row $L_1$ to $L_N$.

Figure 11:
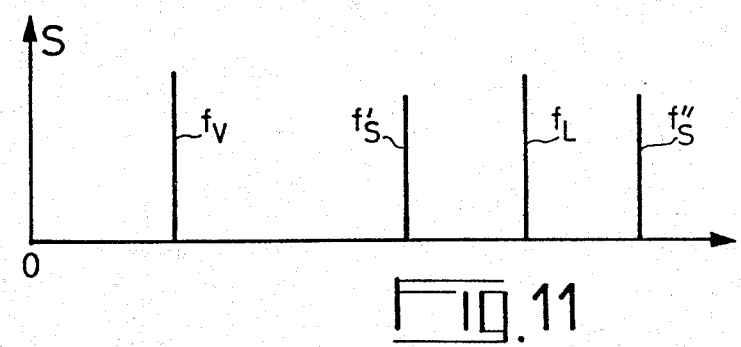
FIG. 11 is an explanatory diagram.

As regards frequency-conversion, the arrangements which can be used are illustrated in FIG. 11. The frequency of the bulk waves is marked $f_V$, that of the local oscillator $f_L$, and the two possible beat frequencies characterising the surface waves $f'_S$ and $f''_S$. When the lower beat frequency $f'_S$ is adopted, it is observed that the sign of the phase-shift is reversed, with resultant projection of a real image by means of ultrasounds focussed at a finite distance. On the contrary, the sign of the phase-shift is preserved with the upper beat frequency $f''_S$, leading to the type of operation illustrated in FIG. 10. Operation which involves the sign of the phase-shift being preserved is naturally of interest when a parallel beam is being projected. If the radiated beam is divergent, an auxiliary convergent lens must be provided upstream of the probe in order to obtain a real image.

What I claim is:

1. System for visually displaying the image of a thin section of a body by ultrasonics, said system comprising: an ultrasonic generator, a scanning probe and means for visual display of said image; said system further comprising a frequency-converter ultrasonic lens made up of a first array of N bulk wave electromechanical transducers forming said scanning probe, a group of N frequency conversion circuits connected to a common local oscillator and a second array of N surface-wave electromechanical transducers arranged on a substrate; said first and second arrays of transducers having their corresponding transducers interconnected two-by-two by said frequency conversion electrical circuits so as to constitute a transmission link having N channels in which N electrical signals circulate; the frequency of said bulk waves being equal to the difference between the frequency of said surface waves and that of the signal produced by said local oscillator; the surface of the substrate carrying said second array of N transducers being equipped with at least one third array of surface-wave electromechanical transducers which, imaged by said frequency converter ultrasonic lens, carries out discrete scanning of the section through focussing the ultrasonic energy exchanged between said ultrasonic generator and said visual display means.

2. System as claimed in claim 1, wherein said ultrasonic generator is associated with an electromechanical transducer transmitting a ultrasonic beam irradiating the section to be visually displayed; said scanning probe picking up the ultrasonic radiation emerging from the body being irradiated; the transducers in said third array delivering electrical signals exploited by said visual display means.

3. System as claimed in claim 2, wherein said visual display means comprise writing-in means sweeping an area of visual display in two directions: said writing-in means being controlled by said electrical signals after the latter have been spread out in time by transmission means having staggered delays.

4. System as claimed in claim 3, wherein said staggered-delay transmission means comprise a surface-wave delay line having transmitting transducers excited by said electrical signals and a receiving transducer controlling said writing-in means.

5. System as claimed in claim 2, wherein the surface of said substrate carries a plurality of third arrays of surface-wave electromechanical transducers; change-over switching means successively connecting each of said third arrays to said visual-display means.

6. System as claimed in claim 1, wherein said ultrasonic generator successively feeds the transducers making up said third array in order that said scanning probe may project a focussed ultrasonic beam angularly sweeping said section; the ultrasonic radiation emerging from said body insonified by said scanning probe being picked up by an electromechanical transducer connected to said visual-display means.

7. System as claimed in claim 6, wherein said ultrasonic generator successively feeds a plurality of third arrays of transducers in order to scan said section remotely by modifying the distance of focussing of the ultrasonic beam projected by said scanning probe.

8. System as claimed in claim 1, wherein the configuration of said second array is scaled similar to that of said first array in the ratio of the respective wavelengths of the surface waves propagated on the surface of said substrate and of the bulk waves propagating between said scanning probe and said body.

9. System as claimed in claim 1, wherein at least one of said first and second arrays is rectilinear.

10. System as claimed in claim 1, wherein at least one of said first and second arrays is concave.

11. System as claimed in claim 8, wherein said N surface-wave electromechanical transducers are transducers in the form of interdigitated combs.

12. System as claimed in claim 11, wherein the teeth of said combs are rectilinear.

13. System as claimed in claim 11, wherein the teeth of said combs are concave.

14. System as claimed in claim 1, wherein the transducers of said third array are transducers in the form of interdigitated combs.

15. System as claimed in claim 4, wherein the transducers of said delay line are transducers in the form of interdigitated combs.

16. System as claimed in claim 1, wherein said frequency conversion circuits reverse the sign of the phase of the incident signals.

17. System as claimed in claim 1, wherein said frequency conversion circuits preserve the sign of the phase of the incident signals.

* * * * *